(12) United States Patent
Willems

(10) Patent No.: US 9,956,840 B2
(45) Date of Patent: May 1, 2018

(54) ELECTROMECHANICAL ROTATIONAL DAMPER WITH TENSION AND COMPRESSION STOP

(71) Applicant: AUDI AG, Ingolstadt (DE)

(72) Inventor: Marco Willems, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 0 days. days.

(21) Appl. No.: 15/123,503

(22) PCT Filed: Feb. 5, 2015

(86) PCT No.: PCT/EP2015/000223
§ 371 (c)(1),
(2) Date: Sep. 2, 2016

(87) PCT Pub. No.: WO2015/131972
PCT Pub. Date: Sep. 11, 2015

(65) Prior Publication Data
US 2017/0072758 A1 Mar. 16, 2017

(30) Foreign Application Priority Data

Mar. 5, 2014 (DE) ........................ 10 2014 003 219

(51) Int. Cl.
*F16F 15/03* (2006.01)
*B60G 15/02* (2006.01)
(Continued)

(52) U.S. Cl.
CPC ............. *B60G 15/02* (2013.01); *B60G 13/14* (2013.01); *F16F 15/022* (2013.01); *F16F 15/03* (2013.01);
(Continued)

(58) Field of Classification Search
CPC .... B60G 15/02; B60G 13/14; B60G 2202/22; B60G 2202/422; B60G 2202/30;
(Continued)

(56) References Cited

U.S. PATENT DOCUMENTS 8,573,604 B2  11/2013  Willems
9,080,649 B2   7/2015  Willems
(Continued)

FOREIGN PATENT DOCUMENTS

CN    102729765 A    10/2012
DE    197 47 566 C1    4/1999
(Continued)

OTHER PUBLICATIONS

International Search Report issued by the European Patent Office in International Application PCT/EP2015/000223.
(Continued)

*Primary Examiner* — Anna M Momper
(74) *Attorney, Agent, or Firm* — Henry M Feiereisen LLC

(57) ABSTRACT

A rotational damper includes a damper housing surrounding an electromagnetic damper motor and connected to a first mass via a fastening part; a coupling lever supported for pivoting relative to the damper housing and connected with a second mass; a strain wave gear mechanism for damping vibrations and including a rigid unit having an internal spline and being connected with the damper housing, and a flexible unit having an external spline and being fastened with the fastening part, wherein the first and second units are coupled with each other via the internal and external splines; a wave generator rotatably supported in the flexible unit, wherein a rotation of the wave generator causes a deformation of the flexible unit; and a wrap spring connected on one side in rotative fixed relationship with the coupling lever, (Continued)

and on another side connected in rotative fixed relationship with the fastening part, wherein at a predetermined pivoting of the coupling lever relative to the fastening part the wrap spring deforms the flexible unit thereby blocking the strain wave gear mechanism.

7 Claims, 3 Drawing Sheets

(51) Int. Cl.
*B60G 13/14* (2006.01)
*F16F 15/02* (2006.01)

(52) U.S. Cl.
CPC ........ *F16F 15/035* (2013.01); *B60G 2202/22* (2013.01); *B60G 2202/30* (2013.01); *B60G 2202/422* (2013.01); *B60G 2204/419* (2013.01); *B60G 2204/4191* (2013.01); *B60G 2204/45* (2013.01); *B60G 2206/41* (2013.01); *B60G 2300/60* (2013.01)

(58) Field of Classification Search
CPC .. B60G 2206/41; F16F 13/005; F16F 15/022; F16F 15/03; F16F 15/035
See application file for complete search history.

(56) References Cited

U.S. PATENT DOCUMENTS

| | | | |
|---|---|---|---|
| 9,120,361 B2 | 9/2015 | Willems | |
| 9,136,743 B2 | 9/2015 | Willems | |
| 9,193,239 B2 | 11/2015 | Willems | |
| 9,300,188 B2 | 3/2016 | Willems | |
| 9,397,545 B2 | 7/2016 | Willems | |
| 9,415,655 B2 | 8/2016 | Willems | |
| 2004/0097318 A1 | 5/2004 | Greuel et al. | |
| 2007/0261516 A1* | 11/2007 | Saito | F16H 49/001 74/640 |
| 2009/0299480 A1* | 12/2009 | Gilbert | A61F 2/582 623/18.11 |
| 2013/0049508 A1 | 2/2013 | Willems | |
| 2013/0154404 A1 | 6/2013 | Willems | |
| 2013/0320791 A1 | 12/2013 | Willems | |
| 2014/0165758 A1* | 6/2014 | Moune | F16H 49/001 74/412 R |
| 2014/0217663 A1 | 8/2014 | Willems | |
| 2014/0285043 A1 | 9/2014 | Willems | |
| 2014/0300072 A1* | 10/2014 | Willems | B60G 7/02 280/124.1 |
| 2014/0360825 A1* | 12/2014 | Willems | B60G 13/16 188/292 |
| 2015/0051528 A1 | 2/2015 | Gilbert et al. | |
| 2015/0108321 A1 | 4/2015 | Willems | |
| 2015/0159730 A1 | 6/2015 | Willems | |
| 2015/0251513 A1* | 9/2015 | Willems | B60G 11/18 267/195 |
| 2015/0273969 A1 | 10/2015 | Willems | |
| 2015/0306933 A1 | 10/2015 | Willems | |
| 2017/0130803 A1* | 5/2017 | Willems | F16F 15/035 |
| 2017/0211658 A1* | 7/2017 | Willems | F16F 15/18 |

FOREIGN PATENT DOCUMENTS

| | | |
|---|---|---|
| DE | 101 17 934 A1 | 10/2002 |
| DE | 101 37 230 C1 | 4/2003 |
| DE | 10 2005 002 501 U1 | 5/2005 |
| DE | 10 2009 048 818 A1 | 4/2011 |
| DE | 10 2011 009 608 A1 | 8/2012 |
| DE | 10 2011 006 094 A1 | 9/2012 |
| DE | 101 17 934 B4 | 9/2012 |
| DE | 10 2011 101 350 A1 | 11/2012 |
| DE | 10 2011 101 701 A1 | 11/2012 |
| DE | 10 2011 102 743 A1 | 11/2012 |
| EP | 1 354 731 A1 | 10/2003 |
| EP | 1 354 731 B1 | 10/2003 |
| WO | WO 2011/042085 A1 | 4/2011 |
| WO | WO-2012156047 A1 * | 11/2012 ............. B60G 13/16 |
| WO | WO-2012163492 A1 * | 12/2012 ............... B60G 7/02 |
| WO | WO 2013/138912 A1 | 9/2013 |
| WO | WO 2013/0138912 A1 | 9/2013 |

OTHER PUBLICATIONS

Chinese Search Report dated Mar. 31, 2017 with respect to Chinese counterpart Chinese patent application 201580011288.5.
English translation of Chinese Search Report dated Mar. 31, 2017 with respect to Chinese counterpart Chinese patent application 201580011288.5.

* cited by examiner

ELECTROMECHANICAL ROTATIONAL DAMPER WITH TENSION AND COMPRESSION STOP

CROSS-REFERENCES TO RELATED APPLICATIONS

This application is the U.S. National Stage of International Application No. PCT/EP2015/000223, filed Feb. 5, 2015, which designated the United States and has been published as International Publication No. WO 2015/131972 and which claims the priority of German Patent Application, Serial No. 10 2014 003 219.1, filed Mar. 5, 2014, pursuant to 35 U.S.C. 119(a)-(d).

BACKGROUND OF THE INVENTION

The invention relates to a rotational damper with a damper housing which surrounds an electromagnetic damper motor and is fastened to a first mass via a fastening element and with an coupling lever which is supported for pivoting relative to the damper housing and is connected with a second mass, and a strain wave gear mechanism for vibration damping which has a rigid unit having an inner spline and is connected with the damper housing and a flexible unit having an outer spline and is connected with the fastening element, wherein the two units of the strain wave gear mechanism are form fittingly coupled with each other via the splines for transmitting and/or converting a rotational movement, and with an oval wave generator which is rotatably supported in the flexible unit, wherein a rotation of the wave generator causes a deformation of the flexible unit.

An electric damper of the aforementioned type is known from WO 2011/042085 A1 for damping the relative movement between a first and a second mass. The damper includes a strain wave gear mechanism with an oval wave generator which is driven by the mass movement and which is integrated in a transmission, wherein a first transmission element that forms a stator is caused to perform a rotational movement whereby a second transmission element which forms a rotor and is directly or indirectly coupled with the first transmission element is rotated. Either on the first or on the second transmission element means for generating a magnetic field are provided. The strain wave gear mechanism includes a flexible unit with an external spline, a rigid unit with an internal spline meshing with the external spline and the wave generator which is arranged in the of the flexible unit and deforms the flexible unit.

DE 101 37 230 C1 discloses an electrically driven strain wave gear mechanism with a rigid unit which has a spline and a flexible unit which also has a spline, wherein the flexible unit undergoes a dynamic elastic deformation so that the spline of the flexible unit is brought into engagement with the spline of the rigid unit always in separate regions so that the flexible unit moves relative to the rigid unit, wherein the dynamic elastic deformation of the flexible unit is caused by magnetic forces which are influenced by means of electrical currents. The flexible unit has a flux-conducting region, which is configured for conducting magnetic fluxes and for this purpose has sufficient cross sectional surfaces, wherein magnetic fluxes flowing via the flux-conducting region cause magnetic forces which act on the flux-conducting region and with this act directly on the flexible unit.

DE 197 47 566 C1 relates to a piezo-driven strain wave gear mechanism with a rigid unit which has a spline, so called "circular spline", a flexible unit which also has a spline, so-called flex spline, and an ellipsoid wave generator which dynamically deforms the flexible unit so that the spline of the flexible unit can be brought into engagement with the spline of the rigid unit always in two separate regions so that the flexible unit moves relative to the rigid unit. The wave generator has piezo-actuating elements, which are arranged fixed in position relative to the flexible unit and deform the flexible unit by means of mutually coordinated length changes.

The mentioned state of the art discloses so-called strain wave gear mechanisms in connection with the damping in wheel suspensions of motor vehicles, however there are no sufficient means to limit the maximal deflection of the deflection lever during deflection of the damper, which is undesired in connection with damping devices for motor vehicles.

EP 1 354 731 B1 relates to a damping arrangement for a vehicle suspension, which includes a torsion spring unit and a rotational damper. In order to limit the deflection of a lever arm of the wheel suspension a resilient stop is provided which is connected with the vehicle superstructure. Thus a stop for limiting the movement of the wheel suspension is provided which is independent from the damper, and is thus associated with increased construction costs.

DE 10 117 934 B4 relates to a drive with a motor and a transmission which is arranged downstream of the motor, in particular for motor vehicles with an automatically closable vehicle door. In order to decouple the drive shaft of the transmission a disengageable transmission is used which includes a transmission housing with a cylindrical hollow space in which an epicyclic gear mechanism is rotabably supported, which is provided with a housing and has concentric input and output shafts. The housing of the epicyclic gear mechanism can be rotatively fixed relative to the transmission housing via a braking device, which is actuatable by an actuator. Such a braking device however does not have the reliability required with regard to a rotational damper for a motor vehicle suspension.

SUMMARY OF THE INVENTION

In light of the foregoing the invention is based on the object to provide a rotational damper, which is a constructively compact and at the same time reliably limits the deflection movement of the coupling lever relative to the fastening device element or the damper housing.

For this the rotational damper is characterized by a wrap spring operatively connected with the flexible unit, which wrap spring on one of its sides is connected with the coupling lever and on the other side with the fastening element, wherein the wrap spring is configured to block the strain wave gear mechanism at a predetermined pivoting of the coupling lever relative to the fastening element by deformation of the flexible unit.

As a result of the radial deformation of the flexible unit, i.e., the flex splines, the flexible unit can no longer rotate in the rigid unit, i.e., the circular spline and the transmission provides a high blocking effect as a result of the high transmission ratio on the flex spline side, which can be 1:50 or even 1:320 as is known.

As a result of the pivoting of the coupling lever relative to the fastening element the ends of the wrap spring are pulled toward each other, which reduces the inner diameter of the wrap spring to the degree that it eventually comes into contact with the flexible unit (Flex spline). At a defined deflection angle the wrapping of the spring causes a deformation of the flexible unit so that the flexible unit no longer yields which in turn renders the wave generator unable to move or rotate.

The invention ensures the functionality of the rotation damper in en emergency, because no external actuator is required. The limiting stop is clearly defined when a desired deflection angle between the coupling lever and the fastening element is reached. Because the strain wave gear mechanism has very high overload ratios the deformation of the flexible unit can be achieved by relatively small forces which makes it possible to construct the respective structural components simply and easily even though the deformation of the flexible unit results in a very high jamming force (blocking effect), which is significantly higher than the braking effect of conventional braking devices.

According to an advantageous embodiment, the rotational damper according to the invention is characterized in that the wrap spring is on one side supported on the rigid unit via a first stop and on the other side is fastened on a housing cover which is connected with the coupling lever and is rotatably supported on the damper housing via a second stop. This simple and secure arrangement of the wrap spring on the rigid unit and the housing cover ensures a safe and reliable support and function of the wrap spring.

According to a further advantageous embodiment, the rotational damper according to the invention is characterized in that the flexible unit has a gearing section, which is situated between the rigid unit and the wave generator and a wall section which extends axially to the strain wave gear mechanism, and that the wrap spring is arranged about the axial wall section. With this advantageous configuration of the flexible unit the wrap spring can be arranged in the flexible unit without adversely effecting the function of the strain wave gear mechanism.

According to a further advantageous embodiment the rotational damper according to the invention is characterized in that the axial wall section at its end which is situated distal to the functional section has a radial wall section which is connected with the housing cover which results in a simple and secure fixation of the flexible unit on the housing cover.

According to a further advantageous embodiment, the rotational damper according to the invention is characterized in that the damper unit includes an electromagnetic damper motor with a rotor and a stator, wherein the stator is connected with the damper housing and the rotor is supported for rotation on a bearing part which is arranged fixed in position relative to the damper housing, which results in a compact arrangement of the damper motor in the rotational damper.

According to a further advantageous embodiment, the rotational damper according to the invention is characterized in that the stator is connected with the rigid unit and the rotor is connected with the wave generator, which advantageously enables transmitting the forces from the coupling lever or the fastening element into the strain wave gear mechanism.

BRIEF DESCRIPTION OF THE DRAWING

Further advantages and applications of the present invention will become apparent from the following description in connection with the exemplary embodiments shown in the drawing.

In the description, in the claims and in the drawing the terms and associated reference numerals listed in the list of reference signs below are used. In the drawing it is shown in:

DETAILED DESCRIPTION OF PREFERRED EMBODIMENTS

Figure 1:
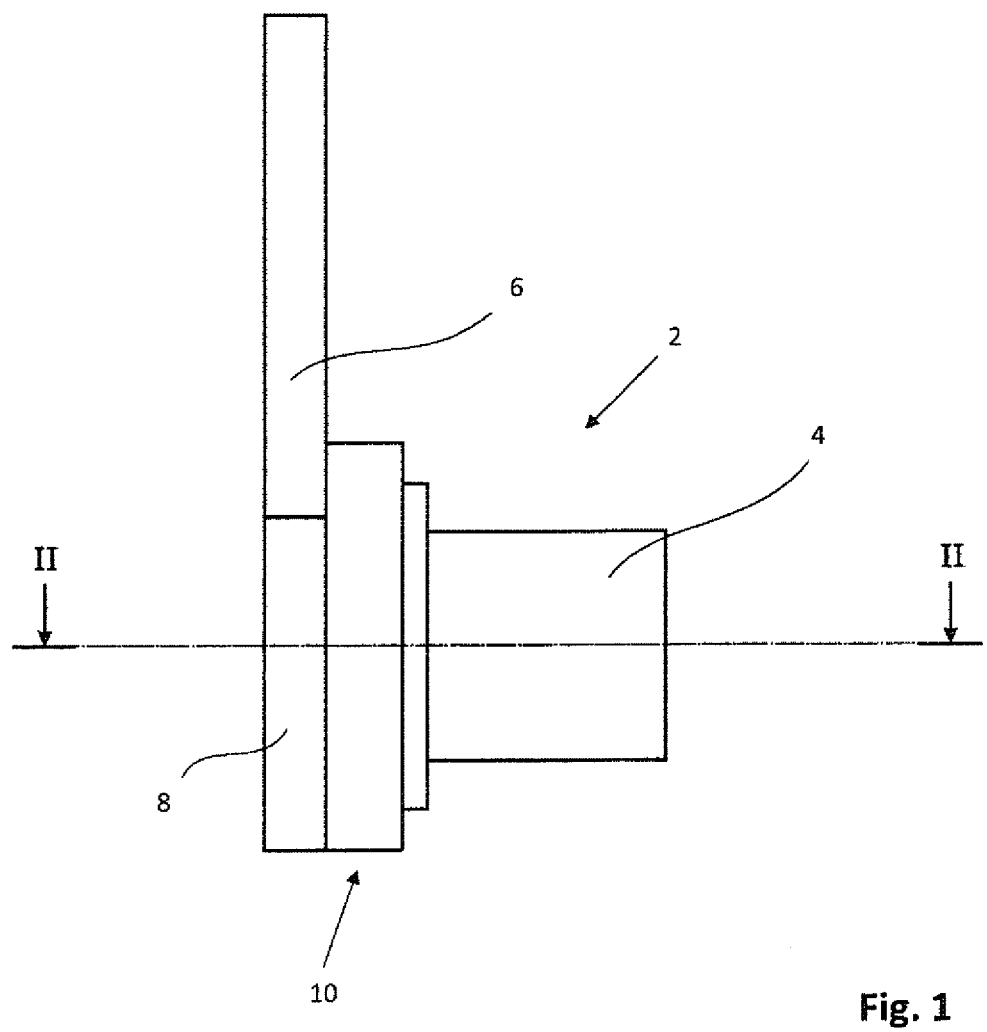
FIG. 1 a side view of the rotational damper according to the invention.

FIG. 1 shows a side view of the rotational damper 2 with a damper housing 4, which is fastened on a mass, i.e. the wheel suspension or the vehicle superstructure, via a fastening element (not shown). A coupling lever 6 is supported for pivoting relative to the housing and is connected with a second mass, i.e., the vehicle superstructure or the wheel suspension. The coupling lever 6 is connected with a housing cover 8, which is supported for rotation on the damper housing 4. Between the damper housing 4 and the housing cover 8 a strain wave gear mechanism 10 is arranged.

Figure 2:
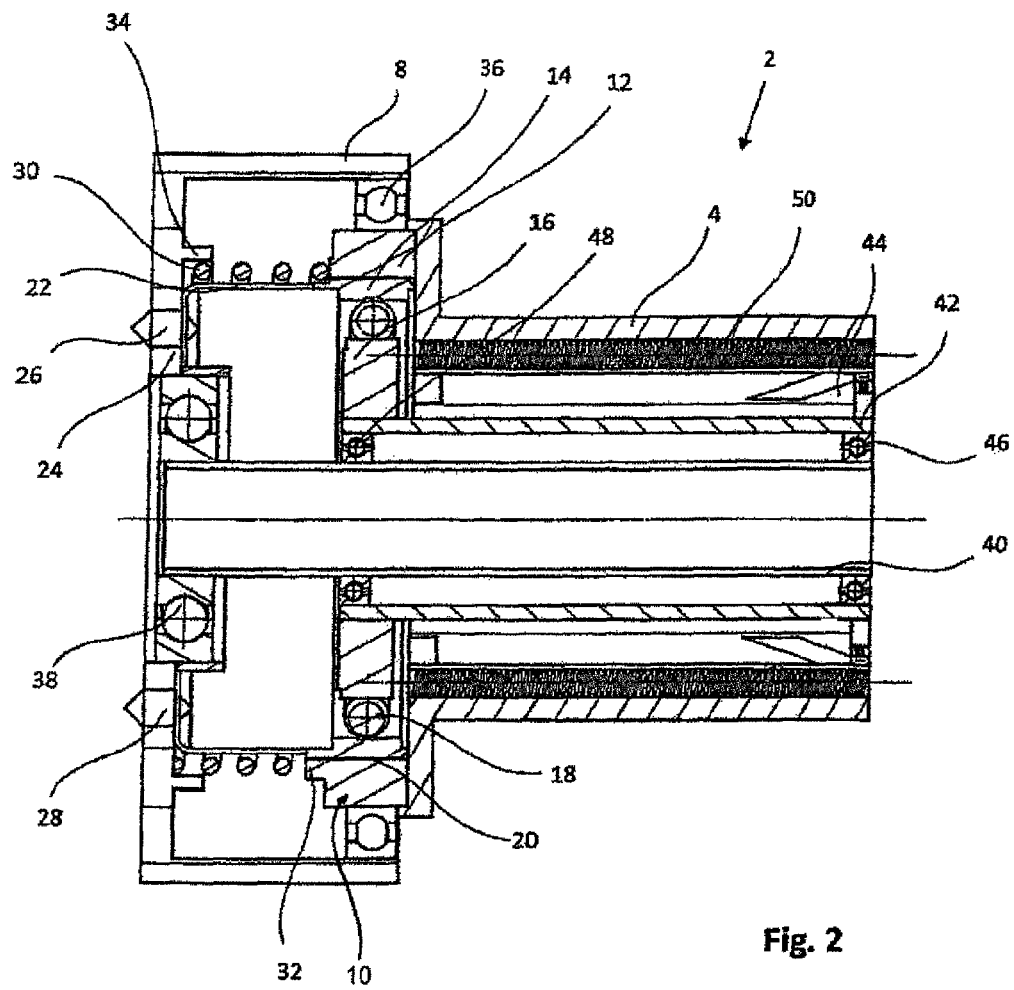
FIG. 2 a sectional view of the rotational damper according to the invention along the line II-II in FIG. 1.

FIG. 2 shows a section through the rotational damper along the line II-II of FIG. 1. The rotational damper 2 includes the strain wave gear mechanism which includes a rigid unit 12, which has an internal spline and is connected with the damper housing 4, and a flexible unit 14, which has an external spline and is connected with the housing cover 8, as will be described below. The two units 12, 14 of the strain wave gear mechanism are coupled with each other via a form fit for transmitting and/or converting a rotational movement between the coupling lever 6 and the damper housing 4. Inside the flexible unit 14 a wave generator 16 is supported for rotation relative to the damper housing 4, wherein when introducing a rotational force into the strain wave gear mechanism the rotation of the wave generator 16 causes a deformation of the flexible unit 14. Between the flexible unit and the wave generator 16 a rolling bearing 18 is arranged.

The flexible unit 14 has a gearing section 20, which is situated between the rigid unit 12 and the flexible unit 14. Adjoining the gearing section 20 is an axial wall section 22 which is adjoined by a radial wall section 24, which is connected with the housing cover 8 via fastening elements 26, 28 for example rivets.

A wrap spring 30 is wound about the axial wall section 22 of the flexible unit 14. The wrap spring 30 is connected with the coupling lever 6 via the housing cover 8 and with the fastening element (not shown) via the rigid unit 12 and the damper housing 4. For this the wrap spring 30 is on one side anchored on the rigid unit 12 via a first stop 32 and on the other side on the damper hosing 4 via a second stop 34.

In this embodiment of the rotational damper 2, the wrap spring 30 is configured so that the strain wave gear mechanism 10 is blocked at a predetermined pivoting of the coupling lever 6 relative to the damper housing 4 as a result of the deformation of the flexible unit 14.

As shown in FIG. 2 the housing cover 8 is supported on the rigid unit 12 or the damper housing 4 via a first rolling bearing 36. A second rolling bearing 38 is arranged between the housing cover 8 and a bearing part 40, which housing cover is in turn connected with the damper housing 4 or the mass connected with the damper housing 4.

FIG. 2 also shows an electromagnetic damper motor, which has a rotor 42 with a magnet arrangement 44, which is rotatably supported on the bearing part 40 via two rolling bearings 46, 48. The damper motor has further a stator 50, which is connected with the damper housing 4 and has a coil arrangement in order to complete the damper motor.

When the coupling lever 6 pivots relative to the damper housing 4 a rotational movement is introduced into the strain wave gear mechanism 10 from the housing cover 8 via the radial wall section 24, the axial wall section 22 and the flexible unit 14, wherein as a result of a pivoting the rotor 42 rotates relative to the stator corresponding to the transmission ratio of the strain wave gear mechanism 10. By supplying current to the damper motor the damping force is acts in opposition to such a pivoting.

Figure 3:
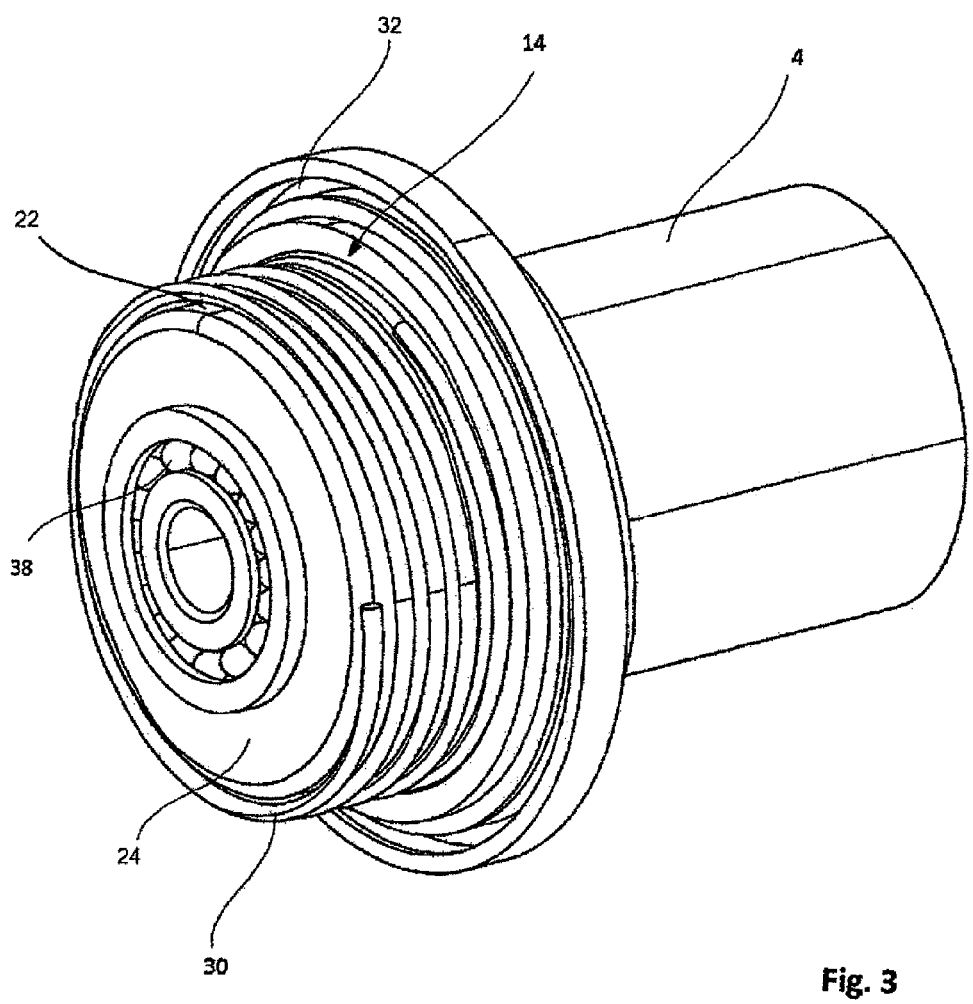
FIG. 3 a perspective view of the damper unit of the rotational damper according to the invention.

FIG. 3 shows a perspective detail view of the damper housing 4 with the wrap spring 30. Of the flexible unit 14 the radial wall section 24 and the axial wall section 22 can be seen and the rigid unit 14 with the first stop 32 for the wrap spring 30.

What is claimed is:

1. A rotational damper, comprising:
an electromagnetic damper motor;
a damper housing disposed in surrounding relationship to the electromagnetic damper motor and connected to a first mass;
a coupling lever supported for pivoting relative to the damper housing and connected with a second mass;
a strain wave gear mechanism configured for damping vibrations and comprising a rigid unit having an internal spline and being connected with the damper housing, and a flexible unit having an external spline coupled with the internal spline of the rigid unit;
a wave generator supported in the flexible unit for rotation to thereby cause a deformation of the flexible unit; and
a wrap spring connected in rotative fixed relationship with both the coupling lever and the damper housing and configured to deform the flexible unit and thereby block the strain wave gear mechanism in the presence of a predetermined pivoting of the coupling lever relative to the damper housing.

2. The rotational damper of claim 1, further comprising a housing cover rotatably supported on the damper housing and connected with the coupling lever, said wrap spring being fixed on the rigid unit via a first stop and being fixed on the housing cover via a second stop.

3. The rotational damper of claim 1, wherein the flexible unit has a gearing section arranged between the rigid unit and the wave generator, and a wall section extending axially relative to the strain wave gear mechanism, said wrap spring being arranged about the axially extending wall section.

4. The rotational damper of claim 3, further comprising a housing cover rotatably supported on the damper housing and connected with the coupling lever, said flexible unit having a radial wall section which adjoins the axially extending wall section at an end of the axially extending wall section that is distal to the gearing section, said radial wall being connected with the housing cover.

5. The rotational damper of claim 3, further comprising a bearing part securely fixed to the damper housing, said electromagnetic damper motor including a rotor rotatably supported by the bearing part, and a stator interacting with the rotor and generating a magnetic field, when energized, said stator being connected with the damper housing.

6. The rotational damper of claim 5, wherein the stator is connected with the rigid unit and the rotor is connected with the wave generator.

7. The rotational damper of claim 5, wherein the stator has a current coil arrangement which becomes energized when supplied with current, said rotor has having a magnet arrangement.

\* \* \* \* \*